United States Patent [19]

Louis et al.

[11] 4,304,606

[45] Dec. 8, 1981

[54] PLASTICIZED COAL TAR PITCH, COMPOSITION CONTAINING SAME AND ITS USE

[75] Inventors: Heinrich Louis; Helmut Köhler; Rudolf Oberkobusch; Gerd Collin, all of Duisburg; Volker Potschka, Hösel, all of Fed. Rep. of Germany

[73] Assignee: Rütgerswerke Aktiengesellschaft, Frankfurt am Main, Fed. Rep. of Germany

[21] Appl. No.: 46,399

[22] Filed: Jun. 6, 1979

Related U.S. Application Data

[63] Continuation of Ser. No. 797,974, May 18, 1977, abandoned.

[30] Foreign Application Priority Data

May 26, 1976 [DE] Fed. Rep. of Germany ....... 2623574

[51] Int. Cl.³ .......................... C08L 95/00; C09D 3/24
[52] U.S. Cl. ..................................... 106/278; 106/284
[58] Field of Search ...................... 106/278, 279, 284; 208/22, 23

[56] References Cited

U.S. PATENT DOCUMENTS

| | | | |
|---|---|---|---|
| 2,304,773 | 12/1942 | Anderton | 208/23 |
| 2,478,654 | 8/1949 | Croyere | 208/23 |
| 2,683,107 | 7/1954 | Juel | 106/284 |
| 2,888,357 | 5/1959 | Pittman et al. | 106/278 |
| 3,372,045 | 3/1968 | Baum et al. | 106/279 |

FOREIGN PATENT DOCUMENTS

938301 10/1963 United Kingdom ................ 106/284

OTHER PUBLICATIONS

Daniels, F. and R. A. Alberty, *Physical Chemistry*, (1961), John Wiley & Sons, Inc., pp. 176-182.

*Primary Examiner*—Lorenzo B. Hayes
*Assistant Examiner*—Amelia B. Yarbrough
*Attorney, Agent, or Firm*—Beveridge, Degrandi, Kline & Lunsford

[57] ABSTRACT

This invention relates to a plasticized coal tar pitch comprising a mixture consisting essentially of about 50 to about 80 weight percent of a coal tar pitch having a softening point of about 40° to about 75° C. (Krämer-Sarnow); and about 50 to about 20 weight percent of a coal tar fraction rich in crystals and having a boiling point of about 350° C. to about 450° C. The mixture is suitable for blending with crude oil bitumen for producing a binder suitable for application to roadways.

13 Claims, 1 Drawing Figure

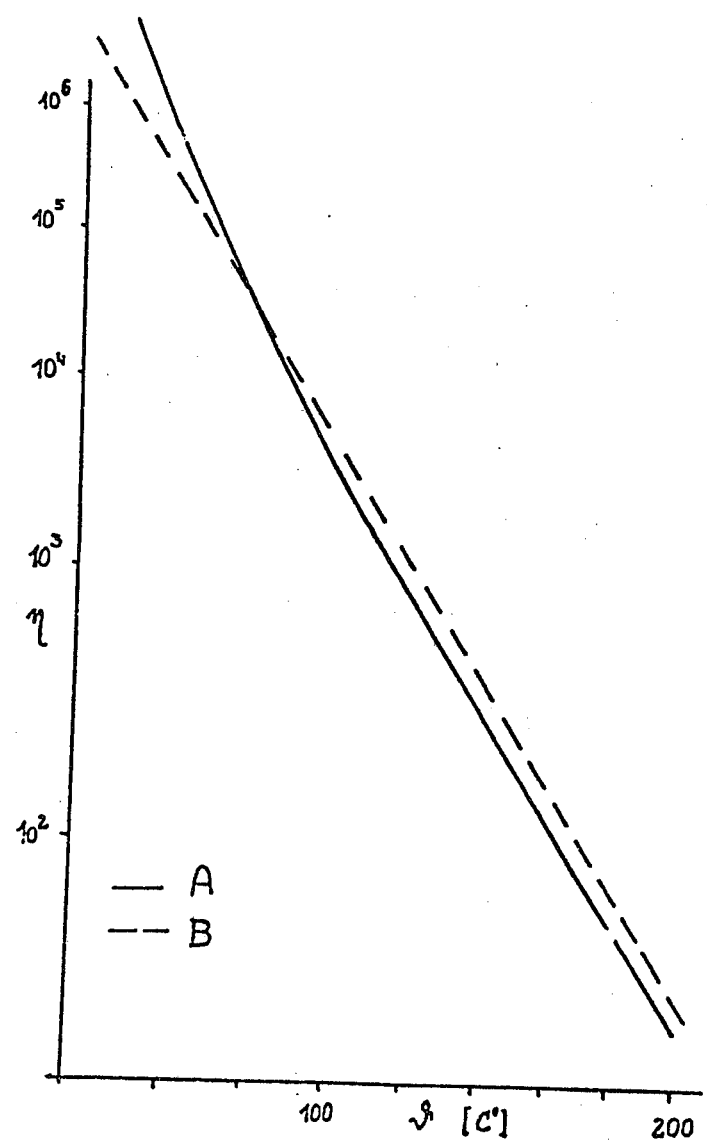

PLASTICIZED COAL TAR PITCH, COMPOSITION CONTAINING SAME AND ITS USE

This is a continuation of application Ser. No. 797,974, filed May 18, 1977, now abandoned.

BACKGROUND OF THE INVENTION

This invention relates to a plasticized coal tar pitch derived from coal tar products. This invention also relates to a composition containing the plasticized coal tar pitch of this invention and crude oil bitumen. Additionally, this invention relates to the use of the plasticized coal tar pitch and composition of this invention for the production of binders, for example, for use in road construction. By means of this invention it is possible to prepare flexible coatings on roadways, wherein the coatings have improved deformation properties.

The use of soft pitch products having softening points below about 40° C. are known for use in the production of binders, useful, for example, in road construction. These soft pitch products consist of a mixture of coal tar pitch having a softening point of 60° to 80° C. and a tar oil fraction consisting of tetranuclear aromatic substances or compositions containing such substances in essential quantity. The mixture of coal tar pitch and tar oil fraction is blended with crude oil bitumen (distilled bitumen) for the production of the binders. See, for example, German Pat. No. 1 009 338.

The following statement is made at column 1, line 50 et seq. of the German Patent: "The tar oil is to be free of substances which separate in a crystalline manner after mixing with the coal tar pitch. Therefore, an oil is used in which the components are in an eutectic equilibrium. If required, the oil may be cooled and any crystals forming can be removed by centrifuging."

The soft pitch products and binders known in the art have not proved to be entirely satisfactory. There exists a need in the art for a plasticized coal tar pitch and a composition containing the plasticized coal tar pitch and crude oil bitumen, wherein these substances are suitable for use in the preparation of flexible coatings for roadways, wherein the coatings have improved deformation properties and improved viscosity properties.

SUMMARY OF THE INVENTION

Accordingly, this invention fulfills these needs in the art by providing a plasticized coal tar pitch comprising a mixture consisting essentially of about 50 to about 80 weight percent of a coal tar pitch having a softening point of about 40° to about 75° C. (Krämer-Sarnow), and about 50 to about 20 weight percent of a coal tar fraction rich in crystals and having a boiling point of mainly about 350° C. to about 450° C., i.e. at least 60% of the coal tar fraction distilled between 350° C. and 450° C. The plasticized coal tar pitch is suitable for mixing with crude oil bitumen B 45, B 25 or B 15 (according to DIN 1995) in a weight ratio of about 20 to about 35 parts by weight of the plasticized coal tar pitch to about 80 to about 65 parts by weight of the bitumen.

This invention also provides a composition of matter consisting essentially of about 20 to about 35 parts by weight of a plasticized coal tar pitch, according to this invention, and about 80 to about 65 parts by weight of crude oil bitumen B 45, B 25 or B 15. The composition of this invention is particularly useful in the preparation of binders for use in road construction.

Additionally, this invention provides a method of using the plasticized coal tar pitch of this invention in the production of a binder for road construction by providing a method comprising mixing the plasticized coal tar pitch of this invention with a crude oil bitumen to form the binder.

BRIEF DESCRIPTION OF THE DRAWING

The FIGURE is a graph depicting the viscosity of a composition of this invention (curve A) and the viscosity of bitumen B 65 (curve B), each as a function of temperature in degrees Centigrade. ($\theta = °C.$; $\eta =$ viscosity).

DETAILED DESCRIPTION

As previously noted, the prior art taught that crystalline substances should be removed from the tar oil fraction before being mixed with coal tar pitch. Thus, it was not recognized that precisely these crystalline substances in high boiling tar oil fractions are of particular advantage. Indeed, it has surprisingly been found that such crystalline substances in the pitch component make it possible to prepare a binder, such as for use in road construction, which exhibits very favorable viscosity and deformation properties, especially when mixed with a crude oil bitumen B 45, B 25 or B 15.

This will be apparent from the FIGURE. Curve A depicts a composition containing 70 parts by weight crude oil bitumen B 25 in admixture with a plasticized coal tar pitch of this invention. The plasticized coal tar pitch contains 65% by weight coal tar pitch having a softening point of 67° C. (Krämer-Sarnow) and 35% by weight of a coal tar fraction rich in crystals and having a boiling point mainly within the range of about 350° to about 450° C. Curve B, on the other hand, is the viscosity curve for crude oil bitumen B 65.

It will be apparent from the FIGURE that the composition of this invention (curve A) has a lower viscosity in the temperature range of 120° to 200° C. than the crude oil bitumen B 65. At temperatures of 100° C. and lower, the viscosity curve of the composition of this invention approaches the viscosity curve of the bitumen B 65. At 75° C., the viscosity curve of bitumen B 65 is intersected; that is to say, that below this temperature the composition of the invention is harder and thus more resistant to deformation than bitumen B 65. In the case of higher temperatures, however, such as those used during processing, the viscosity of the composition of this invention is lower than the viscosity of bitumen B 65. This makes it easier to apply the composition of this invention to roadways.

Bitumen B 65 was employed for purposes of comparison because, according to technical regulations TV bit 3/72, supplement 1975, bitumen B 65 is prescribed in Germany for those surfaces that are exposed to a high traffic load.

The composition of this invention is the same in its external characteristics and in its microscopic picture. In the case of a penetration of 40 (1/10 mm), the softening points lie at about 40° C. (K.S.) and 54° (R+K), and the breaking point according to Fraass is −8° C.

As used herein, the expression "coal tar fraction rich in crystals" is intended to mean a coal tar fraction in which the crystallization point is about 70° C. or above.

In a preferred embodiment of this invention, a plasticized coal tar pitch of the invention is mixed with crude oil bitumen B 25 in a ratio of about 30 parts by weight of the plasticized coal tar pitch to about 70 parts by weight of the bitumen. The resulting product is particularly well-suited for use in the production of binders for road construction. In this preferred embodiment, a plasticized coal tar pitch is preferred, which consists essentially of a mixture of about 65% coal tar pitch having a softening point of about 65° to about 68° C. (Krämer-Sarnow) and about 35% by weight of a coal tar fraction rich in crystals, mainly boiling between about 350° and about 450° C.

In order to achieve good miscibility of the components (homogeneous distribution on microscopic examination), high molecular weight, toluene-insoluble substances in the plasticized coal tar pitch should preferably not exceed about 12 weight percent. Therefore coal tar pitch derived from extraction of coal or from low temperature carbonisation or gassification of bituminous coal or lignite are also well-suited for use in this invention. The bitumen B 25 should have as high an aromaticity as possible, and can be characterized by an asphaltenes content of preferably at least about 20 weight percent.

Whenever an asphalt concrete mixed material is produced using the composition of this invention as a binder, then the asphalt concrete mixed material shows a higher Marshall-stability than if pure crude oil bitumen B 65 is used as a binder. (Cf. Example 5, hereinafter). This is evidence of the fact that a covering layer for a roadway using the composition of this invention as a binder will exhibit a higher resistance to deformation to great traffic loads than the traditional cover layer.

This invention will be more fully understood by reference to the following examples in which all parts, proportions, percentages and ratios are by weight unless otherwise indicated.

EXAMPLE 1

14 parts of a coal tar pitch with a softening point (EP) of 75° C. (Krämer-Sarnow) and 14 parts of a fraction distilled directly from coal tar (boiling point 350° to 450° C. and beginning of crystallization at 73° C.) are mixed while stirring or reverse pumping and heating. The resulting mixture has a softening point of 32° C. (KS). 72 parts of bitumen B 25 with an asphaltenes content of 25% are stirred into the mixture. The pitch/bitumen mixture shows a penetration of 40 (100 g, 5 sec., 25° C.) in 1/10 mm. The mixture may be used preferably as a road building binder.

EXAMPLE 2

As in Example 1, 15 parts of coal tar pitch, softening point 75° C. (KS), are mixed with 15 parts of a pitch distillate fraction originating from hard pitch production, softening point of the mixture is 36° C. (KS). To this are added 70 parts of bitumen B 25. Pitch-bitumen-mixture: penetration 40.

EXAMPLE 3

As in Example 1, 24 parts of coal tar pitch, softening point 40° C. (KS), are mixed with 6 parts of a residue from anthracene production (after the separation by distillation of phenanthrene and anthracene from crude anthracene). Softening point of the mixture is 30° C. (KS). 70 parts of bitumen B 25 are added to that. Pitch-/bitumen-mixture: Penetration 45.

EXAMPLE 4

As in Example 1, 20 parts of coal tar pitch, softening point 68° C. (KS), are mixed with 10 parts of a fraction distilled directly from coal tar (cf. Example 1). The softening point of the mixture is 40° C. (KS). To this are added 70 parts of bitumen B 45. Pitch/bitumen-mixture: Penetration 45.

EXAMPLE 5

(a) If an asphalt-concrete mixed material is produced from the following mineral mixture:

| 15% by weight basalt split | 8/11 mm |
|---|---|
| 15% by weight basalt split | 5/8 mm |
| 16% by weight basalt split | 2/5 mm |
| 22% by weight moraine screening | 0/3 mm |
| 23% by weight of Rhein river sand | 0/3 mm |
| 9% by weight of limestone meal | |
| 100% by weight of mineral mixture | | and 6.6 parts by weight (for 100 parts by weight of mineral mixture) of the binder mixture from Example 1, then this mixed material according to DIN 1996 results in a Marshall stability of 1270 kg at a flow value of 49 1/10 mm.

(b) If a mixed material is produced from the same mineral mixture with 6.9 parts by weight of the same binder mixture, then this will show a Marshall stability of 1100 kg at a flow value of 51 1/10 mm.

(c) If, on the other hand, one produces a mixed material with the same mineral mixture and 6.6 parts by weight of bitumen B 65, then one will obtain a Marshall stability of only 850 kg at a flow value of 49 1/10 mm.

It is to be understood that 6.9 parts by weight of binder mixture from Example 1 [as used in (b)] and 6.6 parts by weight of bitumen B 65 correspond to equal parts by volume because of the different densities.

What is claimed is:

1. A plasticized coal tar pitch comprising a mixture consisting essentially of
   (A) about 50 to about 80 weight percent of a coal tar pitch having a softening point of about 40° to about 75° C. (Krämer-Sarnow); and
   (B) about 50 to about 20 weight percent of a coal tar fraction rich in crystals having a boiling point whereby at least 60% of said fraction is distilled between about 350° C. and about 450° C. and a crystallization point of about 70° C. or above;
wherein said mixture is suitable for mixing with crude oil bitumen B 45, B 25 or B 15, (according to German Industrial Standard 1995) in a weight ratio of about 20 to about 35 parts by weight of said mixture to about 80 to about 65 parts by weight of said bitumen.

2. A plasticized coal tar pitch comprising a mixture consisting essentially of
   (A) about 50 to about 80 weight percent of a coal tar pitch having a softening point of about 40° to about 75° (Krämer-Sarnow); and
   (B) about 50 to about 20 weight percent of a coal tar fraction rich in crystals having a boiling point whereby at least 60% of said fraction is distilled between about 350° C. and about 450° C. and a crystallization point of about 70° C. or above;
wherein said mixture is capable of being blended with a crude oil bitumen B 45, B 25 or B 15 (according to German Industrial Standard 1995) in a weight ratio of about 20 to about 35 parts by weight of said mixture to about 80 to about 65 parts by weight of said bitumen to form a first composition having Marshall-stability greater than a second composition consisting of crude oil bitumen B 65 (according to German Industrial Standard 1995).

3. A composition of matter consisting essentially of:
(A) about 20 to about 35 parts by weight of a plasticized coal tar pitch according to claim 1; and
(B) about 80 to about 65 parts by weight of crude oil bitumen B 45, B 25 or B 15 (according to German Industrial Standard 1995).

4. Method of using the plasticized coal tar pitch of claim 1 in the production of a binder for road construction, comprising mixing said plasticized coal tar pitch with crude oil bitumen to form said binder.

5. Method according to claim 4 comprising mixing about 30 parts by weight of said plasticized coal tar pitch with about 70 parts by weight of crude oil bitumen B 25 (according to German Industrial Standard 1995).

6. Method according to claim 4 wherein said plasticized coal tar pitch consists essentially of about 65 weight percent of a coal tar pitch having a softening point of about 65° to about 68° C. (Krämer-Sarnow) and about 35 weight percent of a coal tar fraction having a boiling point of mainly about 350° C. to about 450° C. and a crystallization point of about 70° C. or above.

7. Method according to claim 5 wherein said plasticized coal tar pitch consists essentially of about 65 weight percent of a coal tar pitch having a softening point of about 65° to about 68° C. (Krämer-Sarnow) and about 35 weight percent of a coal tar fraction having a boiling point of mainly about 350° C. to about 450° C. and a crystallization point of about 70° C. or above.

8. Method according to claim 4 wherein said coal tar pitch is derived from extraction of coal or from low temperature carbonisation or gassification of bituminous coal or lignite.

9. Method according to claim 4 wherein said coal tar pitch has low content of high molecular weight components.

10. Method according to claim 5 wherein said coal tar pitch is derived from extraction of coal or from low temperature carbonisation or gassification of bituminous coal or lignite.

11. Method according to claim 5 wherein said coal tar pitch has low content of high molecular weight components.

12. Composition according to claim 3 in which said plasticized coal tar pitch contains high molecular weight, toluene-insoluble substances in an amount not exceeding about 12 weight percent.

13. Composition according to claim 3 in which component (B) is crude oil bitumen B 25 (according to German Industrial Standard 1995) having an asphaltene content of at least about 20 weight percent.

* * * * *